(12) United States Patent
Gupta

(10) Patent No.: US 9,560,038 B2
(45) Date of Patent: Jan. 31, 2017

(54) METHOD AND APPARATUS FOR VERIFYING AN APPLICATION TO AUTHORIZE CONTENT REPOSITORY ACCESS USING SSL CERTIFICATES

(71) Applicant: Adobe Systems Incorporated, San Jose, CA (US)

(72) Inventor: Shashank Gupta, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/310,025

(22) Filed: Jun. 20, 2014

(65) Prior Publication Data

US 2015/0373013 A1    Dec. 24, 2015

(51) Int. Cl.
  G06F 7/04         (2006.01)
  H04L 29/06        (2006.01)
  G06F 17/30        (2006.01)
  G06F 21/33        (2013.01)

(52) U.S. Cl.
  CPC ......... H04L 63/0823 (2013.01); G06F 17/30 (2013.01); G06F 21/335 (2013.01)

(58) Field of Classification Search
  None
  See application file for complete search history.

(56) References Cited

U.S. PATENT DOCUMENTS 7,430,755 B1 *    9/2008  Hughes ............... H04L 63/0823
                                           726/3
2011/0213966 A1 * 9/2011  Fu et al. ....................... 713/158

* cited by examiner

*Primary Examiner* — Brandon Hoffman
(74) *Attorney, Agent, or Firm* — Keller Jolley Preece

(57) ABSTRACT

A computer implemented method and apparatus for verifying an application to authorize content repository access using SSL certificates. The method comprises receiving a request for accessing a content repository from an application wherein the request is to perform one or more transactions on the content repository; and establishing a user identifier and one or more rules for accessing the content repository wherein the one or more rules are established using an authenticated SSL certificate to verify the application.

20 Claims, 3 Drawing Sheets

METHOD AND APPARATUS FOR VERIFYING AN APPLICATION TO AUTHORIZE CONTENT REPOSITORY ACCESS USING SSL CERTIFICATES

BACKGROUND OF THE INVENTION

Field of the Invention

Embodiments of the present invention generally relate to user validation and software security and, more particularly, to techniques for verifying an application to authorize content repository access using secure sockets layer (SSL) certificates.

Description of the Related Art

In business to business (B2B) environments, transactions involve the exchange of services, information and/or products between a source application and a target application. For example, a publisher might have its authors create literary works using ADOBE® ACROBAT and store the works in a content repository. ACROBAT uses the content repository for storage. In another example, software developers may wish to access a content repository in order to store and access shared software libraries or other software content. The source application can gain access to server content repository using a user identifier and password.

A user device that is running the application may be compromised by a malicious virus or user, putting the password at risk. Network paths providing communications between the application and the content repository are subject to "eavesdropping" technologies, putting the password at risk. Any of these scenarios that put the password at risk create the potential for unauthorized access to the content repository.

Therefore, there is a need for a method and apparatus for verifying an application to authorize content repository access using SSL certificates.

SUMMARY OF THE INVENTION

A method is described for verifying an application to authorize content repository access using SSL certificates. The method comprises receiving a request for accessing a content repository from an application wherein the request is to perform one or more transactions on the content repository. The method establishes a user identifier and one or more rules for accessing the content repository wherein the one or more rules are created using an authenticated SSL certificate to verify the application.

In another embodiment, an apparatus for verifying an application to authorize content repository access using SSL certificates is described. The apparatus includes an access processing module. The access processing module receives a request for content repository access from an application wherein the request is to perform one or more transactions on the content repository. The apparatus establishes a user identifier and one or more rules for accessing the content repository wherein the one or more rules are created using an authenticated SSL certificate to verify the application.

In yet another embodiment, a method for verifying an application to authorize content repository access using SSL certificates is described. The method receives, from an application on a client device, a request for accessing a content repository; and authorizing access to the content repository when one or more rules verify the application.

Figure 1:
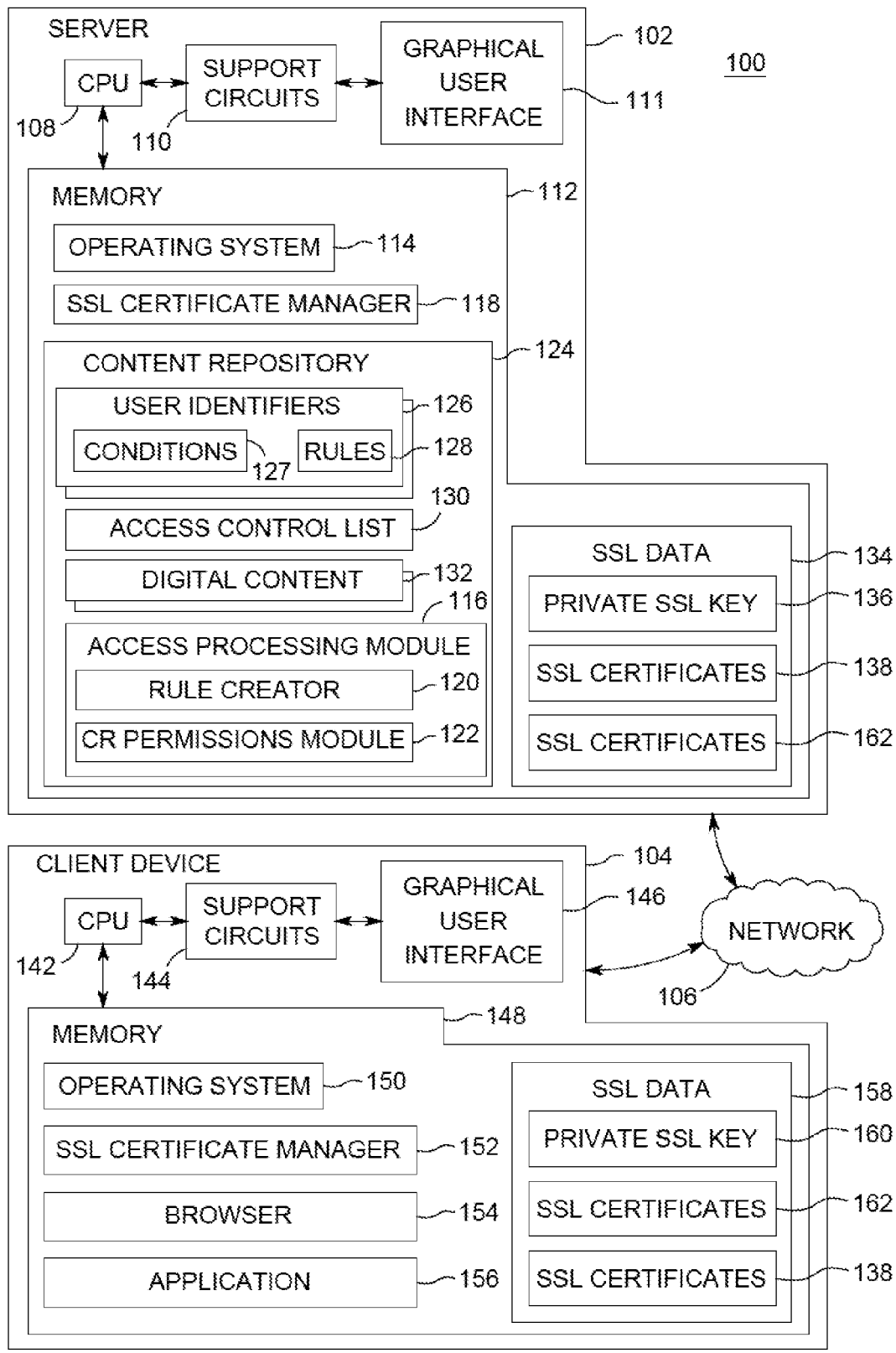
FIG. 1 is a block diagram of a system for verifying an application to authorize content repository access using SSL certificates according to one or more embodiments.

While the method and apparatus is described herein by way of example for several embodiments and illustrative drawings, those skilled in the art will recognize that the method and apparatus for verifying an application to authorize content repository access using SSL certificates is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for verifying an application to authorize content repository access using SSL certificates defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for authenticating an application to authorize content repository access using secured socket layer (SSL) certificates. The embodiments use rules to map a SSL certificate to a user in order to eliminate the need for passwords. Techniques of the present invention include mutual SSL processing to establish conditions that identify the application. Rules are created for an application such that a subsequent access request from the application matches the conditions to the rules and permit access to the content repository.

As previously explained, existing solutions include using a password to verify an authorized application to a content repository. However, there are a number of nontrivial issues associated with those solutions. For example, passwords can be compromised at either a client device where the application resides or a server where the content repository resides. Compromised passwords require corrective actions, for example cancelling accounts and resetting the passwords. In addition, passwords can be intercepted across a communications network connecting the client device and the server. In such case, corrective actions are required to deny unauthorized access. Lastly, passwords can expire, requiring administrators of the client device and the server to establish a new password for the application accessing the content repository.

Thus, and in accordance with an embodiment of the present invention, techniques are provided herein that allow for verifying an application to authorize content repository access using SSL certificates. An SSL certificate is an electronic document that uses a digital signature to bind a public key with an identity—information such as the name of a person or an organization, their address, and the like. In a content repository, the content repository is accessible by an application only after the application has supplied security-related data that verifies the identity of the application.

One or more conditions are created on the server from information contained on an SSL certificate, as provided by the application during mutual SSL processing. The one or more conditions are compared to one or more rules in order to identify an application, as described in further detail below. Once the application is identified, an access control list is used to determine permissions of the identified application within the content repository.

Mutual SSL authentication processing occurs between a client device where the application resides and a server. Once authentication is established between the client device and the server, the application on the client device can access the server using the SSL certificate.

In a secure transaction, when an application on a client device accesses a server, the server establishes an encrypted data communications path through a network connecting the client device and the server. In this context, the secure transaction can be actions for example, reading, writing, modifying, deleting, or printing of content in the content repository, and the like. The server establishes the encrypted data communications path by sending the client device an authenticated SSL certificate. For example, an encrypted data communications path is denoted on a browser page when a domain path beginning with "http://" is changed to "https://". The SSL certificate of the server informs the client device that the identity of the server is verified by an SSL Certificate Authority. Requiring the client device to provide an SSL certificate, the server establishes a mutual SSL certificate authentication between the server and the client device. The SSL certificate of the client device informs the server that the client device is verified by an SSL Certificate Authority.

The SSL certificate of the client device has attributes that are specific to the client device and are used as a means to identify the application of the client device. A content repository administrator creates one or more conditions from the SSL certificate attributes. The content repository administrator establishes one or more rules that match the one or more conditions. For example, a condition/rule may be, "if the SSL certificate's SHA1 fingerprint matches the value "X", then authorize access to userA." Another condition may be, "if the SSL certificate's subject matches the value "Y", then authorize access to userA." A match of one or more conditions to the one or more rules authorizes content repository access for the application identified with the user identifier. In some embodiments, a rule can be defined to match a single condition of the one or more conditions. In some embodiments, the rule can be defined to match a combination of two or more conditions. For example, two conditions can be joined with "and" in which case, each condition must be true for the rule to be true.

The one or more rules are associated with a unique user identifier established for the application. Once the user identifier and the one or more rules are established, the application of the client device can submit requests for content repository access. When the server receives the SSL certificate of the client, as part of the mutual SSL certificate authentication, the content repository extracts information from the SSL certificate. The content repository searches for rules that include the extracted information. The conditions associated with the rules are evaluated. If one or more conditions are met, the application is considered verified. Once the application is verified, access to the content repository is authorized.

As used herein, Single Socket Layer (SSL) is used to describe a protocol, the SSL certificate authentication protocol. The SSL certificate authentication protocol is used by a client device to perform a one-way identity authentication of a server. After authenticating the server and verifying the server is an intended server, an encrypted communication between the client device and the server is established. The encrypted communication is used to pass confidential, private, or other sensitive information from the client device and the server. As used herein, Mutual Single Socket Layer (Mutual SSL) or (MSSL), is used to describe a protocol, the MSSL certificate authentication protocol. MSSL is used to perform a two-way identity authentication between a client device and a server. With MSSL, the client device authenticates an identity of the server and the server authenticates an identity of the client device. After the mutual authentication of identities, an encrypted communication between the client device and the server is established.

Advantageously, the present invention may be used as a feature to authorize secured access such as in the ADOBE® Experience Manager suite of tools. The present invention eliminates a need to configure passwords on a client application, thereby eliminating a need for the application administrator to manage the passwords. Should the client application be compromised, the server is still protected. In the event that business to business communication needs to cease between an application and the server, the SSL certificates can easily be revoked.

Various embodiments of a method and apparatus for verifying an application to authorize content repository access using SSL certificates are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for verifying an application to authorize content repository access using SSL certificates. The system 100 includes a server 102 and a client device 104, communicatively connected via a network 106. The server 102 includes or is connected to a graphical user interface 111. The server 102 is a type of computing device known to one of ordinary skill in the art that is used for providing computing services within the cloud, e.g., a blade server, a virtual machine, and the like. Although the embodiments discussed herein involve a cloud server, one skilled in the art will appreciate the invention may also be performed using any computing device, such as a desktop computer, laptop, tablet computer, and the like. The server 102 includes a Central Processing Unit (CPU) 108, support circuits 110, and a memory 112. The CPU 108 may include one or more commercially available microprocessors or microcontrollers that facilitate data processing and storage. The support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like. The memory 112 includes an operating system 114, an SSL certificate manager 118, a content repository 124 and SSL data 134. The graphical user interface 111 is used to input information, for example, by a server administrator managing application accounts. The graphical user interface 111 allows for the display of content, information, images, graphics, and the like.

The content repository 124 includes user identifiers 126, an access control list 130, digital content 132, and an access processing module 116. The content repository 124 includes the user identifier 126 for each application 156 that is authorized access to the content repository 124. Each user identifier 126 includes one or more conditions 127 and one or more rules 128 that are created by a content repository administrator when the client SSL certificate 162 is validated (via a certificate authority). The access control list 130 stores the permissions of the authenticated application 156, for example viewing, modifying, printing and the like, of the digital content 132. The permissions are stored using the user identifier 126 entry in the access control list 130. The access processing module 116 includes a rule creator 120; and a content repository (CR) permissions module 122. The SSL certificate manager 118 maintains and stores the authentication and security information, that is a private SSL key 136, and an SSL certificate 138 of the server 102. Additionally, the SSL certificate manager 118 maintains and stores an SSL certificate 162 of the client device 104 that the server 102 has authenticated. A user identifier 126 is established for the application 156. The rule creator 120 establishes one or more rules 128 that are used to identify an application 156 that is authenticated. The one or more conditions 127 of the application 156 are compared to the one or more rules 128. When one or more conditions are met, access to the content repository 124 is authorized without the need of a password. The CR permissions module 122 creates one or more permissions for accessing digital content 132 by the authenticated application. The created permissions are stored in the access control list 130 using the user identifier 126. For example, permissions may include authorization to access digital content 132, but deny permission to edit or print the digital content 132.

The SSL data 134 includes the private SSL key 136 and the SSL certificate 138 for the server 102. Additionally, the SSL data 134 includes the SSL certificate 162 of each authenticated client device 104. The SSL data 134 are used to authenticate the server 102 with the client device 104 and to authenticate the client device 104 with the server 102.

The client device 104 is a computing device, such as a desktop computer, a laptop, a tablet computer, and the like. The client device 104 includes a Central Processing Unit (CPU) 142, support circuits 144, and a memory 148. The client device 104 includes or is connected to a graphical user interface 146, allowing inputs from a user, for example a client device administrator. The CPU 142 may include one or more commercially available microprocessors or microcontrollers that facilitate data processing and storage. The support circuits 144 facilitate the operation of the CPU 142 and include one or more clock circuits, power supplies, cache, input/output circuits, and the like. The memory 148 includes at least one of Read Only Memory (ROM), Random Access Memory (RAM), disk drive storage, optical storage, removable storage and/or the like. The memory 148 includes an operating system 150, an SSL certificate manager 152, a browser 154, an application 156, and SSL data 158. The SSL data 158 includes a private SSL key 160 and the SSL certificate 162 for the client device 104. Additionally, the SSL data 158 includes the SSL certificate 138 for the server 102. The SSL data 158 are used to authenticate the client device 104 with the server 102 and authenticate the server 102 with client device 104.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

The application 156 requests access to a content repository 124 on a server 102. To authorize the access for the application 156, the server 102 authenticates the identity of the client device 104 and the requesting application 156. Authentication is performed by an exchange of SSL data 158 of the client device 104 with the server 102. In some embodiments, the exchange is done electronically across the network 106 from the client device 104 to the server 102. In other embodiments, the exchange is done by sending the SSL data 158 on an electronic medium, for example a flash-drive memory. After the application 156 is authenticated and verified, the server administrator establishes a user identifier 126 that is assigned to the application 156. The user identifier 126 allows secure access to the content repository 124.

The application 156 requests access to the content repository 124 and is not granted access because the application 156 is not authorized. The access processing module 116 of the server 102 begins by executing the SSL certificate manager 118. A content repository administrator checks the plurality of user identifiers 126 to determine whether there is user identifier 126 associated with application 156 on the client device 104. Determining there is no user identifier 126, the content repository administrator attempts to authenticate the client device 104. In order to authenticate the client device 104, SSL data is exchanged between the client device 104 and the server 102. In some embodiments, the client device 104 initiates the process of acquiring the SSL data 158 to be exchanged with the server 102. The present disclosure describes an exemplary example in which the client device 104 initiates authentication. However, the embodiments are capable of initiating authentication from the server 102 of the content repository 124.

The SSL certificate manager 152 initiates the authentication through an SSL certificate authentication protocol in which the SSL certificate 162 of the client device 104 is processed. The SSL certificate manager 152 issues a request for SSL data 158. The request is for a private SSL key 160 and an SSL certificate 162. In some embodiments, the SSL certificate manager 152 requests the SSL data 158 from a Certificate Authority. The Certificate Authority authenticates the identity of the requesting client device 104 and issues the private SSL key 160 and the SSL certificate 162. The SSL certificate manager 152 receives the private SSL key 160 and the SSL certificate 162. Upon receiving the data, the SSL certificate manager 152 stores the private SSL key 160 and the SSL certificate 162 with SSL data 158, for example, a keystore of the client device 104. In other embodiments, the client device 104 has been authenticated previously. In such case, the keystore includes the SSL data 158 of the client device 104 and there is no need to request authentication from a Certificate Authority. The SSL certificate manager 152 sends the SSL certificate 162 to the server 102 for further processing by the SSL certificate manager 118.

The SSL certificate manager 118 of the server 102 receives the SSL certificate 162 of the client device 104 for the application 156. The content repository administrator verifies the received SSL data 158 from the client device with a Certificate Authority. During the verification process, the Certificate Authority assures that the SSL certificate 162 is a valid and trusted SSL certificate 162. With the verification from the Certificate Authority, the SSL certificate manager 118 stores the SSL certificate 162 of the application 156 in a trustore, for example ADOBE Granite Trustore. The trustore includes the SSL data 158 of each client device 104 of a plurality of client devices that have been successfully authenticated and verified. The access processing module 116 establishes a user identifier 126 in the content repository 124 that is assigned to the application 156 of the verified client device 104.

The rule creator 120 identifies attributes on the SSL certificate 162 that distinguish the verified application 156 from all other applications requesting access to the content repository 124. The attributes define a condition 127 of the SSL certificate 162. One or more conditions 127 is identified and created for the application 156. For example, one of the one or more conditions 127 can be "an SSL certificate SHA1 fingerprint is the value of 'X'", where 'X' is a predefined value. Another example for the one or more condition 127 is "an SSL certificate's subject has a value of 'Y'", where 'Y' is a predefined value. Since each condition 127 of the one or more conditions 127 helps to identify the application 156, the rule creator 120 can optionally, assign relative importance to each condition 127 of the one or more conditions 127 with a priority value.

The rule creator 120 establishes one or more rules 128 using the one or more conditions 127. The one or more rules 128 map values in the verified SSL certificate 162 to the user identifier 126 to the content repository 124. In one embodiment, the one or more rules 128 include one condition. For example, a valid rule may be: "If the SSL certificate SHA1 fingerprint is the value of 'X', then the application 156 has the user identifier 126 'userA' in the content repository 124". In another embodiment, the one or more rules 128 include two or more conditions 127 using logical operators. Logical operators include, "and," "or," and "not." For example, a valid rule may be: "If the SSL certificate SHA1 fingerprint is the value of 'X', and if the SSL certificate's subject has a value of 'Y', then the application 156 has the user identifier 126 'userA' in the content repository 124". In the example, both conditions 127 must be "true" in order for the one or more rule 128 to be "true". Another example of a valid rule is: "If the SSL certificate SHA1 fingerprint is the value of 'X', or if the SSL certificate's subject has a value of 'Y', then the application 156 has the user identifier 126 'userA' in the content repository". In such example, at least one condition of the one or more conditions 127 must be "true" for the rule 128 to be "true". The rule creator 120 stores the one or more rules 128 with the user identifier 126.

With the user identifier 126 and the one or more rules 128 are established, the CR permissions module 122 assigns one or more permissions for the user identifier 126. The one or more permissions are stored in the access control list 130 in the content repository 124. The access control list 130 specifies the one or more permissions for the digital content 132 in the content repository 124. For example, the access control list 130 may indicate that "userA" has read, write and delete permissions for the digital content 132 of the content repository 124. Alternatively, the access control list 130 may indicate that "userA" has read-only permissions for the digital content 132 of the content repository 124. The access processing module 116 successfully establishes the user identifier 126 associated with the authenticated and verified application 156.

With the user identifier 126 established, the application 156 requests access to the content repository 124. In some embodiments, the request originates from a user using a browser 154 through the graphical user interface 146. In some embodiments, the request originates from a process running the application 156. The access processing module 116 receives the subsequent request, recognizing it is an access request to the content repository 124. The SSL certificate manager 118 of the access processing module 116 initiates a mutual SSL certificate authentication protocol process with the requesting client device 104 of the application 156. The SSL certificate manager 118 of the server 102 performs Mutual SSL authentication with the SSL certificate manager 152 of the client device 104.

The SSL certificate manager 118 sends the SSL certificate 138 of the server 102 to the client device 104. The SSL certificate manager 152 of the client device 104 receives the SSL certificate 138 of the server 102. The SSL certificate manager 152 verifies the SSL certificate 138. The SSL certificate manager 152 accesses the trustore of SSL data 158 to determine whether the SSL certificate 138 of the server has been verified and stored. In some embodiments, the SSL certificate 138 is verified through a Certificate Authority. In other embodiments, the SSL certificate 138 has been verified through an SSL certificate chain as understood by a person skilled in the art. In yet other embodiments, the SSL certificate 138 has been previously verified and is stored in SSL data 158, for example the trustore. For the embodiments that do not have an SSL certificate 138 in the SSL data 158, the SSL certificate manager 152 stores the verified SSL certificate 138 or SSL certificate chain in the trustore of SSL data 158. The SSL certificate manager 152 of the client device 104 sends to the server 102 the SSL certificate 162.

The SSL certificate manager 118 receives the SSL certificate 162 from the client device 104. The SSL certificate manager 118 verifies the SSL certificate 162. The SSL certificate manager 118 checks the trustore of SSL data 134 to determine whether the SSL certificate 162 has been verified and stored. In some embodiments, the SSL certificate 162 is in the trustore from the processing in the previous time epoch. In such case, the SSL certificate 162 is verified. In some embodiments the SSL certificate 162 is not in the trustore of SSL data 134 requiring verification through a Certificate Authority or through an SSL certificate chain, as understood by a person skilled in the art.

The access processing module 116 extracts values from the SSL certificate 162. The access processing module 116 accesses the rules 128 and identifies rules 128 for which the extracted values are included. The one or more conditions 127 of the rule 128 are identified and evaluated using the extracted values. If the one or more conditions 127 are met using the extracted values for one or more rules 128 the access processing module 116 authorizes content repository 124 access for the application 156. The access processing module 116 retrieves the user identifier 126 associated with the matching one or more rules 128. If the one or more conditions 127 are not met, the access processing module 116 denies content repository 124 access for the application 156.

The access processing module 116 uses the user identifier 126 to retrieve permissions granted to the application 156 as specified in the access control list 130. The access processing module 116 enforces the application access to the content repository 124 by the stored permissions.

Figure 2:
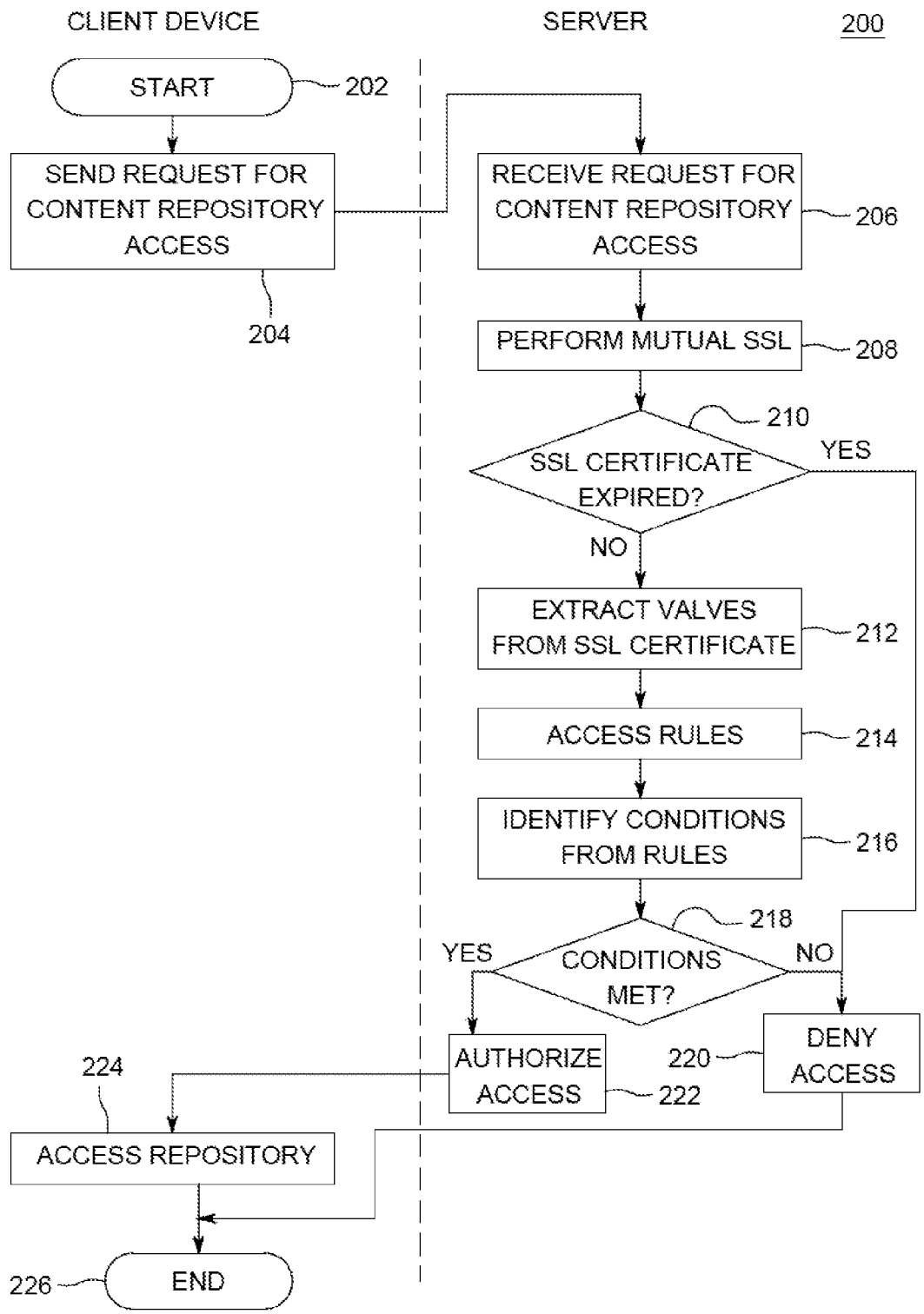
FIG. 2 depicts a flow diagram of a method for verifying an application to authorize content repository access to using SSL certificates as performed by the access processing module of FIG. 1, according to one or more embodiments.

FIG. 2 depicts a flow diagram of a method 200 for verifying an application to authorize content repository access using SSL certificates by the access processing module 116 of FIG. 1 according to one or more embodiments. The method 200 performs steps that require information flowing from the server to the client device and from the client device to the server. The method 200 establishes a user identifier and one or more rules for the application that identify the application as an authenticated user of the content repository. The method 200 generates rules that map to the application conditions such that subsequent access requests by the application are processed without passwords. Once the method 200 completes the authentication, the application is able to access the content repository with a verified user identifier. The method 200 starts at step 202 and proceeds to step 204.

At step 204, the method 200 sends a request for content repository access from the application of the client device to the server. The application requests content repository access to perform one or more transactions. Transactions include viewing, modifying, storing, printing and the like. For example, an author of a novel uses ADOBE Acrobat to generate his manuscript. While executing ACROBAT on his computer, the author submits a request to the publisher, Publisher "X", to store the manuscript in the content repository associated with novels. The method 200 proceeds to step 206.

At step 206, the method 200 receives the request for content repository access from the application of the client device. Continuing the example, the server for Publisher "X" receives the request from the client device of the author of the novel. The method proceeds to step 208.

At step 208, the method 200 performs a Mutual SSL certificate authentication between the server and the client device to verify the identities of the server and client device. The Mutual SSL certification authentication is performed according to the established protocol, as known to one skilled in the art. The method 200 proceeds to step 210.

At step 210, the method 200 determines whether the SSL certificate of the client device is expired. If the SSL certificate is expired, then a new SSL certificate is required and the one or more rules need to be established and the method 200 proceeds to 220. However, if the SSL certificate is not expired, the method 200 proceeds to step 212.

At step 212, the method 200 extracts values from the SSL certificate of the application. The extracted values are attributes from which conditions have been created. The extracted values distinguish the application from other applications. For example, the extracted value based on the name of the client device has the attribute "SSL subject AltName" with a value of "AcrobatAuthor." A further example, the extracted value based on the company name has the attribute "SSL CN". The method 200 proceeds to step 214.

At step 214, the method 200 accesses the plurality of rules from the content repository that include the extracted values. The method 200 searches for the one or more rules that have the extracted values of the certificate included in the rule definition. In some embodiments, the method 200 matches at most one rule with the extracted values. In other embodiments, the method 200 matches two or more rules in the plurality of rules with the one or more conditions of the SSL certificate. For example, the search of the plurality of rules results in finding three rules including the attribute "SSLSubject AltName". The method 200 proceeds to step 216.

At step 216, the method 200 identifies conditions from the one or more rules in the content repository having the extracted values. In some embodiments, the method 200 matches at least two rules with the extracted values. In such embodiments, the priority of the condition within the rule dictates the order in which the rules are processed. The conditions associated with the one or more rules are evaluated. Continuing the example, one rule of the three rules including the attribute, "SSLSubject AltName" has the value "AcrobatAuthor" in the condition. The method 200 proceeds to step 218.

At step 218, the method 200 determines whether the identified conditions have been met. If the conditions of the one or more rules are met, the application is considered verified and the method 200 proceeds to step 222. For example, the condition "SSLSubject AltName" equals 'AcrobatAuthor' is true". In the example, the ACROBAT application on the client device of the author is verified for the publishing content repository. However, if at step 218, the conditions of the one or more rules are not met, the application is considered not verified and the method 200 proceeds to step 220.

At step 220, the method 200 denies content repository access to the application. The method 200 proceeds to step 226 and ends.

At step 222, the method 200 authorizes content repository access to the verified application. The user identifier established for the verified application is used to retrieve permissions granted to the application. The permissions are stored in the access control list of the content repository. The content repository enforces the one or more permissions as the application accesses the content repository. For example, the user identifier "AcrobatAuthor" indicates "viewing permissions" in the publishing content repository. The method 200 proceeds to step 224.

At step 224, the method 200 accesses the content repository. The content repository access is regulated by the permissions authorized by the content repository. Continuing the example, if the ACROBAT application attempts to store a manuscript in the publishing content repository, the transaction is not allowed. The transaction is not allowed because "AcrobatAuthor" has "viewing permissions" in the publishing repository. The method 200 continues to step 226 and ends.

Figure 3:
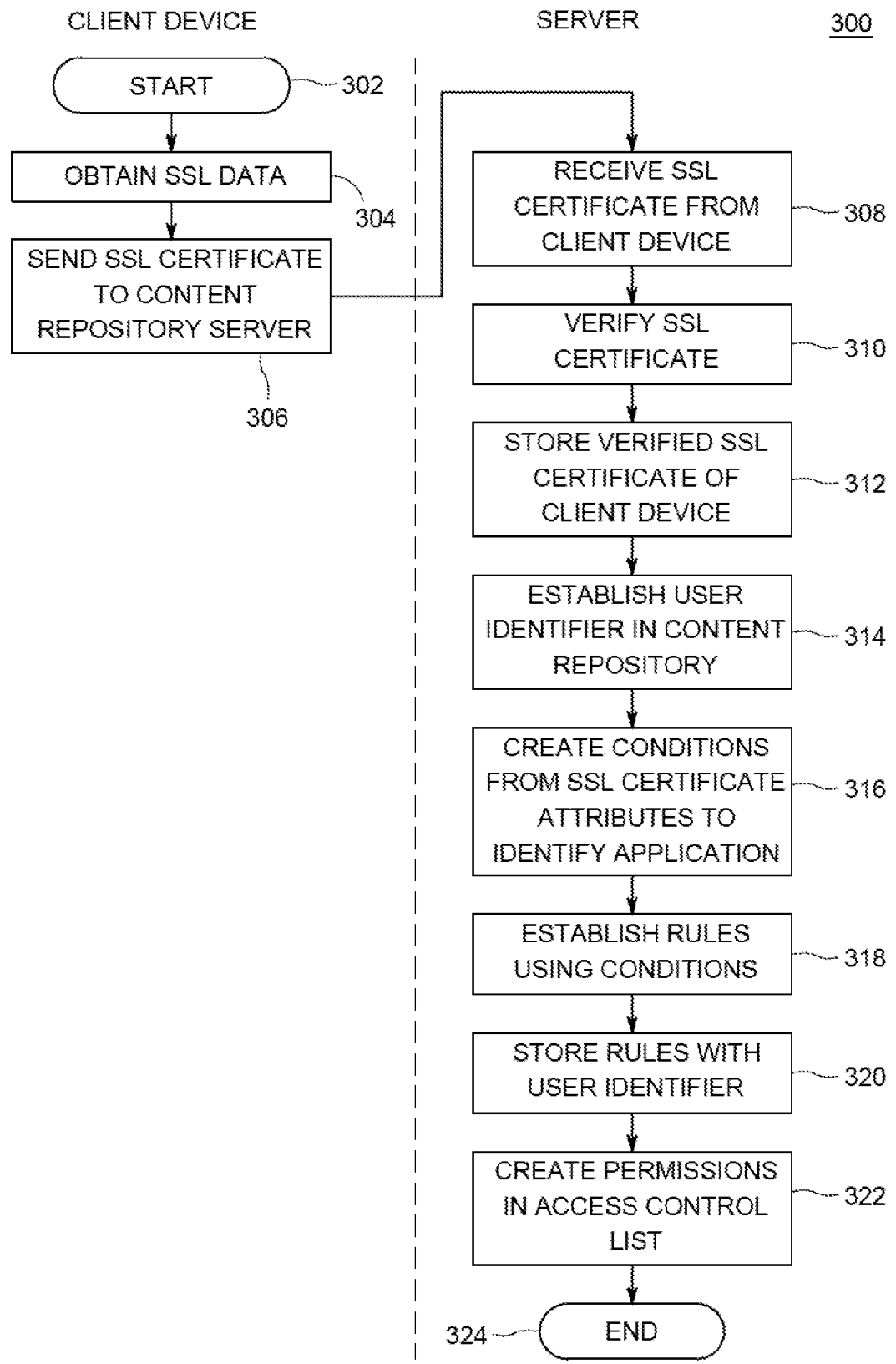
FIG. 3 depicts a flow diagram of a method for establishing a user identifier and one or more rules for accessing a content repository as performed by the access processing module of FIG. 1, according to one or more embodiments.

FIG. 3 depicts a flow diagram of a method 300 for establishing a user identifier and one or more rules for accessing a content repository as performed by the access processing module 116 of FIG. 1, according to one or more embodiments. The method 300 performs steps that require information flowing from a client device to a server. The method 300 starts at step 302 and proceeds to step 304.

At step 304, the method 300 obtains SSL data for the client device. The SSL data includes an SSL certificate a private SSL key. The private SSL key is used for encrypting communications with other computing devices. The SSL certificate authenticates an identity of the client device. The SSL certificate is used in SSL and Mutual SSL certificate authentications. The method 300 stores the private SSL key and the SSL certificate, for example in a keystore. The method 300 proceeds to step 306.

At step 306, the method 300 sends the SSL certificate of the client device to the server, on which the content repository resides. The method 300 sends the SSL certificate to the server to begin the identity verification process with the server. The method 300 proceeds to step 308.

At step 308, the method 300 receives the SSL certificate of the client device. The method 300 proceeds to step 310.

At step 310, the method 300 verifies the SSL certificate of the client device. The method 300 requests verification from one of either a Certificate Authority or a trusted source. In response, the SSL certificate is verified as being a valid and trusted SSL certificate. The method 300 continues to step 312.

At step 312, the method 300 stores a verified SSL certificate of the client device in a trustore of the server. For example, the verified SSL certificate of the client device is stored in a trustore, for example, in the ADOBE Granite Trustore. The application associated with the verified client device SSL certificate is verified to access the server. Having successfully verified access to the server, the method 300 creates information that identifies the application as a verified application to access the content repository. The method 300 continues to step 314.

At step 314, the method 300 establishes a user identifier of the content repository by creating the user identifier on the server. The method 300 assigns the user identifier to the verified application. By assigning the user identifier to the verified application, the method 300 can identify the application when it accesses the content repository. For example, if the application is ADOBE ACROBAT for a book author in New York City, the user identifier can be "NYC_bookauthor". Each transaction the verified application performs on the content repository is done using the user identifier. The method 300 proceeds to step 316.

At step 316, the method 300 creates one or more conditions derived from attribute data on the SSL certificate to identify the application. The SSL certificate of the client device includes a plurality of attributes that uniquely identify the client device, and by association, the application. For example, the method 300 determines the SSL certificate has an "SSL certificate subject" having a value 'X', where 'X' is a predefined value. For example, a valid condition may be: "An SSL certificate subject having a value 'X'". In some embodiments, the method 300 assigns a priority value to the one or more conditions. The priority value assigns a relative importance of the condition as compared with other one or more conditions created. In one embodiment, a condition is depicted as:

```
[cq:AuthorizationCondition]>nt:unstructured
-orderable
-name (string)
-priority (long)
-sslAttribute (string)
-sslAttributeValue(string)
```

The one or more conditions are stored and the method 300 proceeds to step 318.

At step 318, the method 300 establishes one or more rules. The one or more rules allow the administrator to add "logical operators" to the one or more conditions created. Logical operators include "and", "or" and "not". As the rule is being created, it is assigned to the user identifier. An illustrative example is provided to demonstrate some embodiments of creating rules. In the illustrative example, two conditions and the user identifier are retrieved. The first condition is "The SSL certificate CN (company name) having a value of 'X'", where "X" is a predefined value. The second condition is "The SSL certificate subject having a value of 'Y'", where 'Y' is a predetermined value. The user identifier is "NYC_bookauthor". In one embodiment, the one or more rules can be one condition with no logical operator applied. In this case, when the condition is logically "true," then the rule is logically "true." For example, a valid rule may be: "If the SSL certificate CN has the value of 'X', then the user identifier is 'NYC_bookauthor'". In yet another embodiment, two or more conditions are logically joined with the logical operator "and" to create the one or more rules. In this case, each condition of the two or more conditions of the rule must be "true" in order for the rule to be "true". For example, the rule "If the SSL certificate CN has the value of 'X', and the SSL certificate subject having a value of 'Y', then the user identifier is 'NYC_bookauthor'", is a valid rule. The rule is "true", when each of the two conditions is "true". In another embodiment, at least two conditions are logically joined with the logical operator "or" to create the one or more rules. In this case, at least one of the at least two conditions of the rule must be "true" for the rule to be "true". For example, the rule, "If the SSL certificate CN has the value of 'X', or the SSL certificate subject having a value of 'Y', then the user identifier is 'NYC_bookauthor'" is a valid rule. The rule is "true" if either condition or both of the conditions is "true". In yet another embodiment, the one or more rule is created by using the logical operator 'not' with the one or more conditions. In this case, the negated condition must be logically "false" for the rule to be true. For example, the rule, "Not if the SSL certificate CN has the value of 'X', then the user identifier is 'NYC_bookauthor'", is a valid rule. In one embodiment, a rule is depicted as:

```
[cq:AuthorizationRule]>nt:unstructured
orderable
+ condition(cq:AuthorizationCondition)
+ * (cq:AuthroizationRule)
[cq:AndAuthroizationRule]>cq:AuthorizationRule
[cq:OrAuthorizationRule]>cq:AuthorizationRule
```

The method 300 proceeds to step 320. At step 320, the method 300 stores the one or more rules with the user identifier. The method 300 proceeds to step 322.

At step 322, the method 300 creates one or more permissions for the user identifier in an access control list of the content repository. Although access has been authorized for the user identifier, the method 300 creates one or more permissions the user identifier can perform within the content repository. Permissions include viewing, modifying, printing and the like. For example, the method 300 assigns the user identifier permission to view and modify content in the content repository. The method 300 proceeds to step 324 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java™, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   establishing an encrypted data communications path between a client device and a server by authenticating an SSL certificate;
   receiving a request, over the encrypted data communications path, for accessing a content repository at the server from an application on the client device, wherein the request is to perform one or more transactions on the content repository;
   establishing a user identifier for the application on the client device and one or more rules for accessing the content repository, wherein the one or more rules map one or more values extracted from the authenticated SSL certificate to the user identifier for the application; and
   receiving, from the client device over the encrypted data communications path, a subsequent request to access the content repository; and
   authorizing access to the content repository based on the user identifier identified based on the one or more values extracted from the authenticated SSL certificate in place of requiring a password.

2. The method of claim 1, further comprising:
   verifying the SSL certificate of the client device with at least one of a Certificate Authority or a trusted source;
   storing a verified SSL certificate of the client device; and
   storing the user identifier in the content repository.

3. The method of claim 1, wherein establishing the one or more rules comprises:
   identifying one or more conditions from the SSL certificate that help to identify the application; and
   mapping the user identifier to the one or more conditions.

4. The method of claim 3, wherein the one or more conditions map values in the SSL certificate to the application sending the SSL certificate.

5. The method of claim 3, further comprising assigning a priority to each of the one or more conditions.

6. The method of claim 1, further comprising creating permissions for the user identifier in an access control list.

7. The method of claim 6, wherein the permissions allow at least one of read, write, delete, or print access.

8. The method of claim 1, further comprising:
establishing another encrypted data communications path between the client device and the server by authenticating the SSL certificate;
extracting one or more values from the authenticated SSL certificate; and
using the one or more values extracted from the authenticated SSL certificate to identify the user identifier for the application mapped to the one or more values.

9. A computer implemented method comprising:
establishing an encrypted data communications path between a client device and a server by authenticating an SSL certificate;
receiving, from an application on the client device over the encrypted data communications path, a request to access a content repository;
extracting one or more values from the authenticated SSL certificate;
using the one or more values extracted from the authenticated SSL certificate to identify a user identifier for the application mapped to the one or more values; and
authorizing access to the content repository based on the user identifier identified based on the one or more values extracted from the authenticated SSL certificate in place of requiring a password.

10. The method of claim 9, wherein:
authenticating the SSL certificate comprises performing a mutual SSL certificate authentication between the client device and the server to verify an identity of each of the client device and the server; and
using the one or more values extracted from the authenticated SSL certificate to identify the user identifier for the application mapped to the one or more values comprises:
retrieving one or more conditions associated with the extracted one or more values;
accessing one or more rules from the content repository that include the extracted values;
identifying the application based on the one or more rules in the content repository; and
authorizing access to the content repository for the application when the one or more conditions of the one or more rules are met.

11. The method of claim 9, wherein authorizing access to the content repository for the application further comprises permitting one or more transactions by the application as specified in an access control list of the content repository.

12. An apparatus for verifying an application to authorize content repository access using SSL certificates comprising:
one or more processors; and
a non-transitory storage medium storing instructions, that when executed by the one or more processors, cause the apparatus to:
establish an encrypted data communications path between a client device and a server by authenticating an SSL certificate;
receive a request, over the encrypted data communications path, for accessing a content repository at the server from an application on the client device, wherein the request is to perform one or more transactions on the content repository, and
establish a user identifier for the application on the client device and one or more rules for accessing the content repository, wherein the one or more rules map one or more values extracted from the authenticated SSL certificate to the user identifier for the application, such that the server authorizes access to the content repository using the SSL certificate in place of requiring a password.

13. The apparatus of claim 12, wherein authenticating the SSL certificate comprises:
receiving the SSL certificate from the client device of the application requesting content repository access;
verifying the SSL certificate of the client device with one of either a Certificate Authority or a trusted source; and
storing a verified SSL certificate of the client device.

14. The apparatus of claim 12, wherein the instructions, when executed by the one or more processors, further cause the apparatus to:
create one or more conditions from the SSL certificate that identify the application sending the SSL certificate;
establish the one or more rules using a combination of the one or more conditions; and
store the one or more rules with the user identifier.

15. The apparatus of claim 14, wherein the one or more conditions map values in the SSL certificate to the application sending the SSL certificate.

16. The apparatus of claim 14, wherein the instructions, when executed by the one or more processors, further cause the apparatus to create assign a priority to each of the one or more conditions.

17. The apparatus of claim 12, wherein the instructions, when executed by the one or more processors, further cause the apparatus to create permissions for the user identifier in an access control list.

18. The apparatus of claim 17, wherein the permissions allow at least one of read, write, delete, or print access to content in the content repository.

19. The apparatus of claim 12, wherein the instructions, when executed by the one or more processors, further cause the apparatus to:
perform a mutual SSL certificate authentication between the client device and the server to verify identities;
extract one or more values from an SSL certificate of the client device to retrieve one or more conditions associated with the application;
retrieve one or more conditions associated with the extracted one or more values;
access one or more rules from a content repository that include the extracted one or more values;
identify an application based the one or more rules in the content repository; and
authorize access to the content repository for the application when the one or more conditions of the one or more rules are met.

20. The apparatus of claim 16, wherein the instructions, when executed by the one or more processors, further cause the apparatus to authorize access to the content repository for the application to permit one or more transactions by the application as specified in an access control list of the content repository.

* * * * *